United States Patent
Lee et al.

(10) Patent No.: US 12,266,824 B2
(45) Date of Patent: Apr. 1, 2025

(54) BATTERY MODULE, METHOD OF MANUFACTURING BATTERY MODULE AND BATTERY PACK INCLUDING BATTERY MODULE

(71) Applicant: LG ENERGY SOLUTION, LTD., Seoul (KR)

(72) Inventors: Youngho Lee, Daejeon (KR); Sung Dae Kim, Daejeon (KR); Soo Youl Kim, Daejeon (KR); Subin Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 713 days.

(21) Appl. No.: 17/436,291

(22) PCT Filed: Jul. 10, 2020

(86) PCT No.: PCT/KR2020/009098
§ 371 (c)(1),
(2) Date: Sep. 3, 2021

(87) PCT Pub. No.: WO2021/096021
PCT Pub. Date: May 20, 2021

(65) Prior Publication Data
US 2022/0181749 A1     Jun. 9, 2022

(30) Foreign Application Priority Data
Nov. 14, 2019 (KR) .......... 10-2019-0145974

(51) Int. Cl.
*H01M 50/507* (2021.01)
*H01M 10/04* (2006.01)
(Continued)

(52) U.S. Cl.
CPC ..... *H01M 50/507* (2021.01); *H01M 10/0468* (2013.01); *H01M 50/211* (2021.01); *H01M 50/516* (2021.01)

(58) Field of Classification Search
CPC .......... H01M 50/507; H01M 10/0468; H01M 50/211; H01M 50/516; H01M 50/553;
(Continued)

(56) References Cited

U.S. PATENT DOCUMENTS

| 2008/0241679 A1 | 10/2008 | Okutani et al. |
| 2012/0183840 A1 | 7/2012 | Lee et al. |

(Continued)

FOREIGN PATENT DOCUMENTS

| CN | 103650208 A | 3/2014 |
| CN | 107848071 A | 3/2016 |

(Continued)

OTHER PUBLICATIONS

Extended European Search Report for European Application No. 20887993.2, dated Mar. 6, 2023.
(Continued)

*Primary Examiner* — Adam A Arciero
(74) *Attorney, Agent, or Firm* — Birch, Stewart, Kolasch & Birch, LLP

(57) ABSTRACT

Discussed are a battery module and a method of manufacturing the battery module. A battery module according to an embodiment of the present disclosure includes a battery cell stack in which a plurality of battery cells are stacked, a busbar frame connected to the battery cell stack and having a plurality of busbars, cell terraces each protruding from battery cells adjacent to each other among the plurality of battery cells included in the battery cell stack, and electrode leads each protruding from the cell terraces and having the same polarity, wherein the electrode leads overlap with the (Continued)

same busbar among the plurality of busbars, and include at least two welding points at overlapping portions of the same busbar and the electrode leads.

13 Claims, 4 Drawing Sheets

(51) Int. Cl.
*H01M 50/211* (2021.01)
*H01M 50/516* (2021.01)

(58) Field of Classification Search
CPC ... H01M 50/505; H01M 50/533; H01M 50/50
See application file for complete search history.

(56) References Cited

U.S. PATENT DOCUMENTS

| | | | |
|---|---|---|---|
| 2014/0120406 A1 | 5/2014 | Kim | |
| 2014/0220419 A1 | 8/2014 | Yoshioka et al. | |
| 2018/0169790 A1 | 6/2018 | Bin et al. | |
| 2019/0148706 A1 | 5/2019 | Ohnishi | |
| 2019/0189979 A1 | 6/2019 | Choi et al. | |
| 2019/0280279 A1 | 9/2019 | Lee et al. | |
| 2019/0305285 A1 | 10/2019 | Tao et al. | |
| 2019/0386283 A1 | 12/2019 | Lee et al. | |
| 2020/0067066 A1* | 2/2020 | Kim | H01M 50/124 |
| 2020/0112014 A1 | 4/2020 | Kim et al. | |
| 2020/0147734 A1 | 5/2020 | Hong et al. | |
| 2020/0189400 A1 | 6/2020 | Kim et al. | |
| 2020/0194788 A1 | 6/2020 | Chol et al. | |
| 2020/0350547 A1 | 11/2020 | Chi et al. | |
| 2021/0288387 A1* | 9/2021 | Cho | H01M 50/50 |

FOREIGN PATENT DOCUMENTS

| | | | | |
|---|---|---|---|---|
| CN | 107925028 | A | 4/2018 | |
| CN | 108140778 | A | 6/2018 | |
| CN | 207719304 | U | 8/2018 | |
| CN | 109196684 | A | 1/2019 | |
| CN | 110087825 | A | 8/2019 | |
| CN | 110340549 | A | 10/2019 | |
| CN | 110140235 | A | 2/2025 | |
| EP | 5041460 | B2 | 10/2012 | |
| EP | 3 537 504 | A1 | 9/2019 | |
| EP | 3 690 987 | A1 | 8/2020 | |
| EP | 3 698 914 | A1 | 8/2020 | |
| JP | 2008-251411 | A | 10/2008 | |
| JP | 2013-89489 | A | 5/2013 | |
| JP | 2014-521197 | A | 8/2014 | |
| JP | 6202210 | B2 | 10/2017 | |
| KR | 10-1063208 | B1 | 8/2011 | |
| KR | 10-2013-0049984 | A | 5/2013 | |
| KR | 10-2019-0008136 | A | 1/2019 | |
| KR | 10-2019-0016691 | A | 2/2019 | |
| KR | 10-2019-0029037 | A | 3/2019 | |
| KR | 10-2019-0060376 | A | 6/2019 | |
| KR | 10-2019-0073933 | A | 6/2019 | |
| KR | 10-2019-0115939 | A | 10/2019 | |
| KR | 10-2019-0122055 | A | 10/2019 | |
| WO | WO 2019/074208 | A1 | 4/2019 | |
| WO | WO 2019/103344 | A1 | 5/2019 | |
| WO | WO 2019/156520 | A1 | 8/2019 | |
| WO | WO-2020075966 | A1 * | 4/2020 | H01M 50/20 |

OTHER PUBLICATIONS

International Search Report for PCT/KR2020/009098 mailed on Oct. 29, 2020.

* cited by examiner

[FIG. 1]
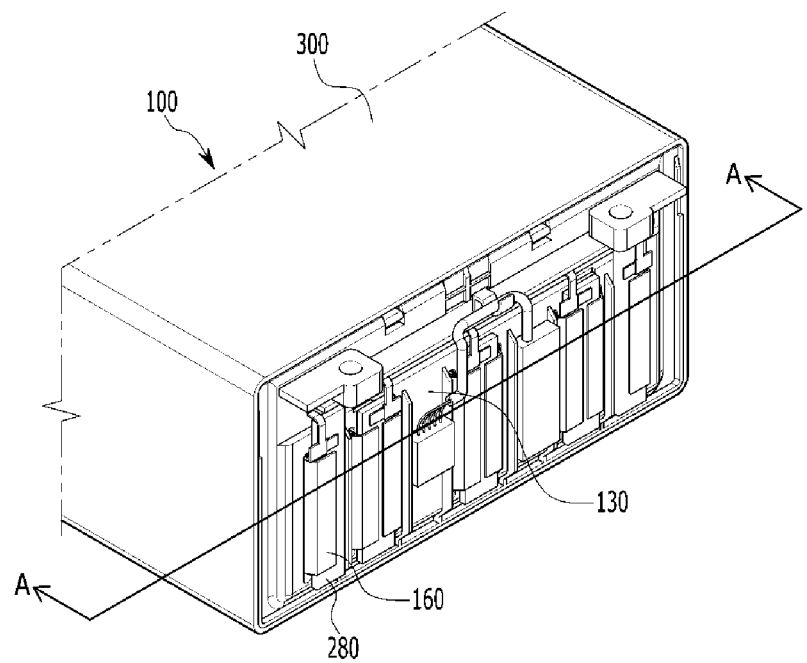
[FIG. 2]
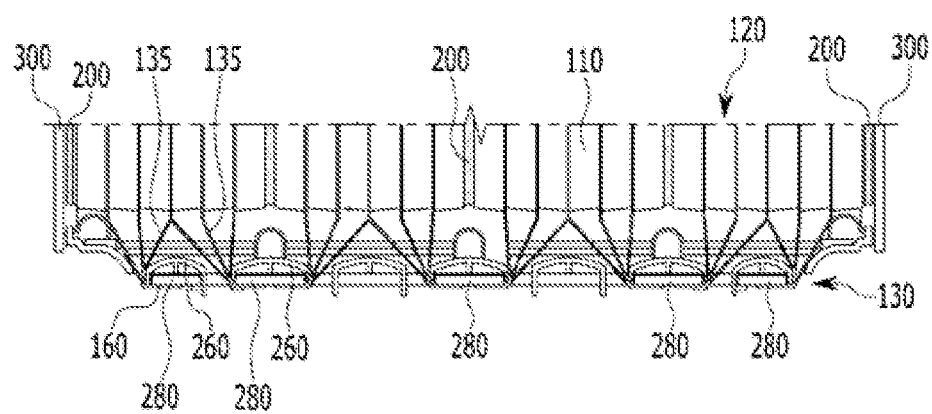

[FIG. 3]
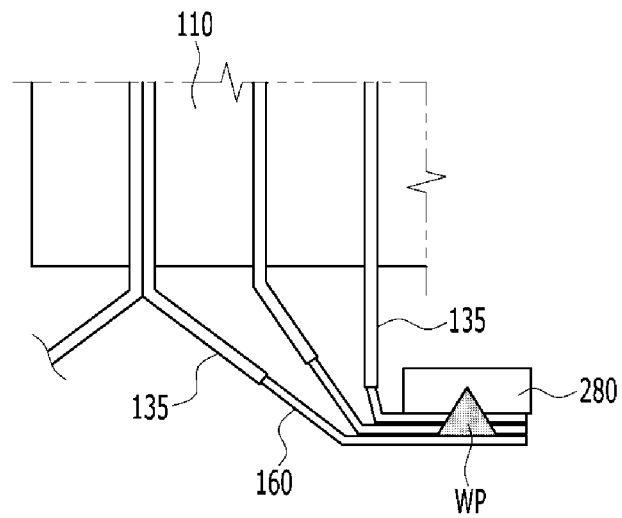
[FIG. 4]
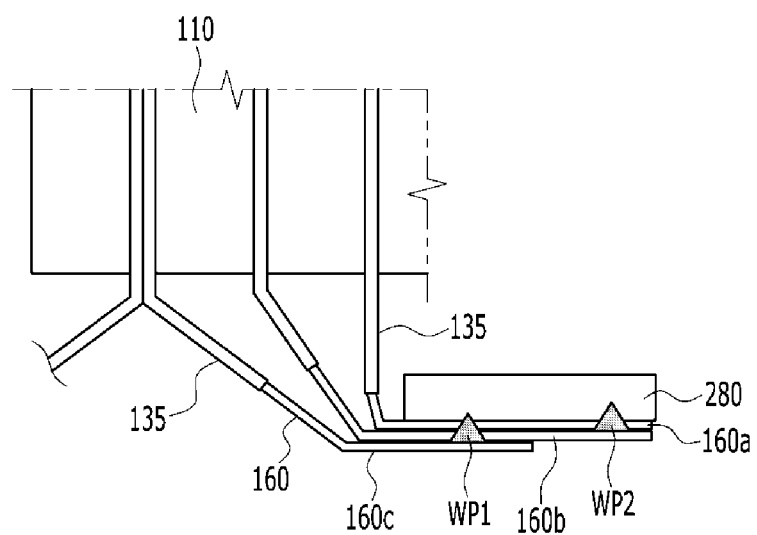

【FIG. 5】
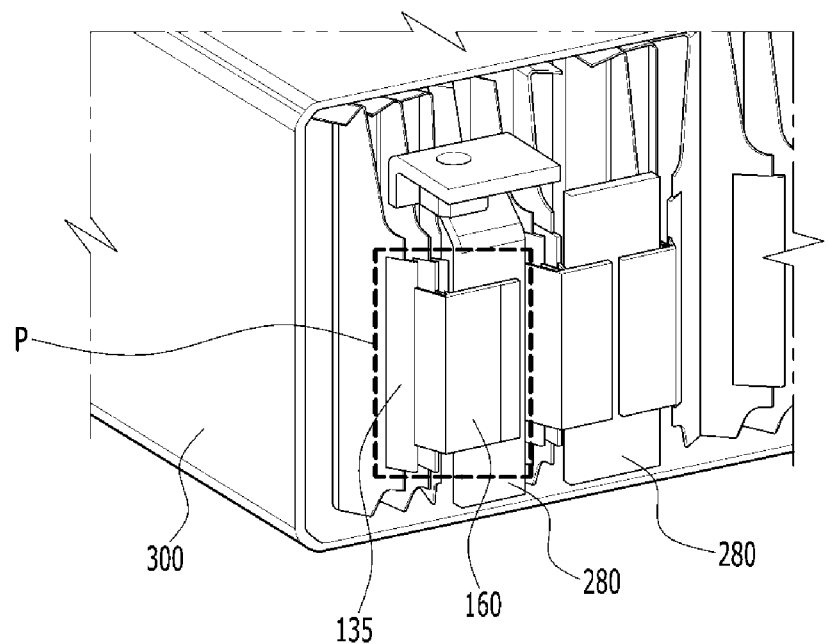
【FIG. 6】
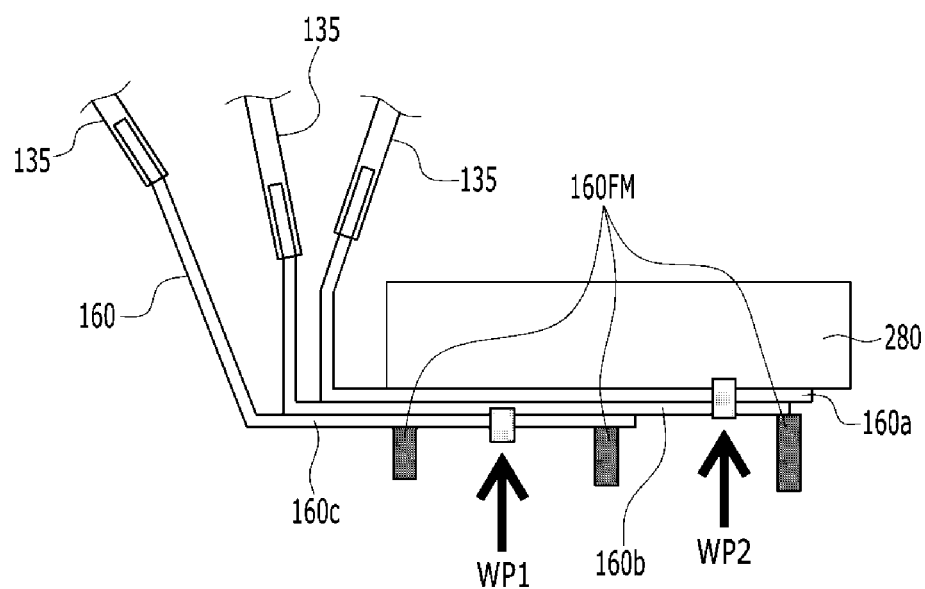

[FIG. 7]
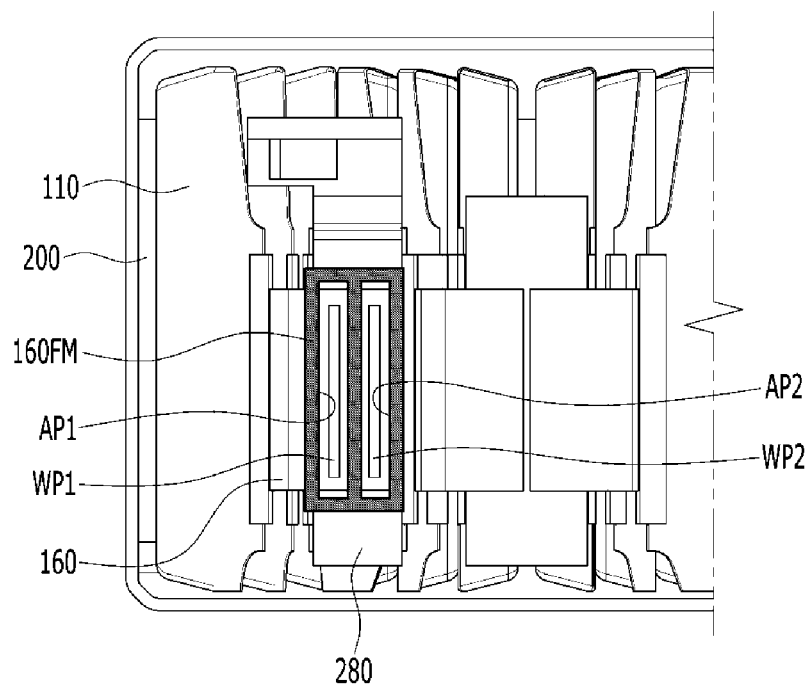

BATTERY MODULE, METHOD OF MANUFACTURING BATTERY MODULE AND BATTERY PACK INCLUDING BATTERY MODULE

CROSS CITATION WITH RELATED APPLICATION(S)

This application claims the benefit of Korean Patent Application No. 10-2019-0145974 filed on Nov. 14, 2019 with the Korean Intellectual Property Office, the disclosure of which is incorporated herein by reference in its entirety.

TECHNICAL FIELD

The present disclosure relates to a battery module, a method of manufacturing a battery module, and a battery pack including a battery module, and more particularly, to a battery module having improved welding structure, a method of manufacturing the battery module, and a battery pack including the battery module.

BACKGROUND ART

Secondary batteries, which are easily applicable to various product groups and has electrical characteristics such as high energy density, are universally applied not only for a portable device but also for an electric vehicle or a hybrid electric vehicle, an energy storage system or the like, which is driven by an electric driving source. Such secondary battery is attracting attention as a new environment-friendly energy source for improving energy efficiency since it gives a primary advantage of remarkably reducing the use of fossil fuels and also does not generate by-products from the use of energy at all.

Small-sized mobile devices use one or several battery cells for each device, whereas middle- or large-sized devices such as vehicles require high power and large capacity. Therefore, a middle- or large-sized battery module having a plurality of battery cells electrically connected to one another is used.

Meanwhile, as the need for a large capacity structure is increasing along with the utilization as an energy storage source in recent years, there is a growing demand for a battery pack with a multi-module structure in which a plurality of battery modules, each including a plurality of secondary batteries connected in series and/or in parallel, are integrated.

Meanwhile, when a plurality of battery cells are connected in series or in parallel to configure a battery pack, it is common to configure a battery module composed of at least one battery cell first, and then configure a battery pack by using at least one battery module and adding other components.

When connecting a battery cell stack and a busbar in the battery module, the location of the busbar can have a significant influence on the size of the battery module. Moreover, in a conventional battery module, as the number of cell terraces and battery cells increase, the number of electrode leads increases accordingly. Therefore, there is a necessity for forming the electrode lead and the cell terrace to have a compact shape. In addition, the amount of electrode lead cutting due to a cutting process of the electrode lead may increase, which may result in cost loss.

DETAILED DESCRIPTION OF THE INVENTION

Technical Problem

The present disclosure is directed to providing a battery module having improved welding structure, a method of manufacturing the battery module, and a battery pack including the battery module.

However, the problem to be solved by the embodiments of the present disclosure is not limited to the above-described problems, and can be variously expanded within the scope of the technical idea included in the present disclosure.

Technical Solution

The battery module of the present disclosure may include a battery cell stack in which a plurality of battery cells are stacked, a busbar frame connected to the battery cell stack, cell terraces each protruding from the battery cells adjacent to each other among the battery cells included in the battery cell stack, and electrode leads each protruding from the cell terraces and having the same polarity, wherein the electrode leads may overlap with the same busbar and have at least two welding points at overlapping portions of the busbar and the electrode leads.

The electrode leads are formed of N number of leads, and the N electrode leads overlap with the same busbar, wherein a first welding portion welded between the N electrode leads, and a second welding portion welded between N−1 electrode leads among the N electrode leads, with the electrode lead closest to the busbar and the busbar being welded, may be formed.

The N electrode leads may include a first electrode lead, a second electrode lead, and a third electrode lead, wherein the first electrode lead, the second electrode lead, and the third electrode lead are bent toward the same busbar, and the bending angle may increase in the order of the first electrode lead, the second electrode lead, and the third electrode lead.

The length of the third electrode lead overlapping with the busbar may be shorter than the length of the first electrode lead overlapping with the busbar.

The cell terraces from which the electrode leads having the same polarity protrude may have narrowing spacing along the direction in which the electrode leads protrude.

A method of manufacturing a battery module according to another embodiment of the present disclosure includes the steps of: forming a battery cell stack by stacking a plurality of battery cells, overlapping electrode leads each protruding from the battery cells adjacent to each other among the battery cells on the same busbar, and welding the electrode leads and the busbar in at least two different locations among the overlapping portions of the electrode leads and the busbar.

The step of welding the electrode leads and the busbar may include forming a first welding portion for welding electrode leads adjacent to each other, and a second welding portion for welding the electrode leads adjacent to each other with the busbar.

The method of manufacturing the battery module may further include, fixing the electrode leads by pressing the electrode leads with a fixing jig before forming the first welding portion and the second welding portion.

The fixing jig may have a first opening corresponding to the first welding portion and a second opening corresponding to the second welding portion.

A battery pack according to another embodiment of the present disclosure includes the battery module described above.

Advantageous Effects

According to embodiments, welding points of an overlapping portion of a busbar and an electrode lead can be formed of at least two points when welding a plurality of electrode leads, thereby reducing unnecessary increase in welding machine specifications, and enabling stable management of welding quality.

In addition, cost loss can be minimized by eliminating the cutting process of the electrode lead or reducing the amount of cutting, and a compact battery module structure can be implemented by minimizing the gap between the busbar frame and the battery cell stack.

BRIEF DESCRIPTION OF THE DRAWINGS

FIG. 1 is a perspective view illustrating a portion of a battery module according to an embodiment of the present disclosure.

FIG. 2 is a cross-sectional view taken along the cut line A-A' of FIG. 1.

FIG. 3 is a plan view schematically illustrating a welding structure of an electrode lead and a busbar according to a comparative example.

FIG. 4 is a plan view schematically illustrating a welding structure of an electrode lead and a busbar according to an embodiment of the present disclosure.

FIG. 5 is an enlarged view illustrating a connection relationship between a cell terrace, an electrode lead, and a busbar in FIG. 1.

FIG. 6 is a plan view illustrating region P of FIG. 5.
FIG. 7 is a front view illustrating region P of FIG. 5.

DETAILED DESCRIPTION OF THE EMBODIMENTS

Hereinafter, various embodiments of the present disclosure will be described in detail with reference to the accompanying drawings so that those skilled in the art can easily implement them. The present disclosure may be modified in various different ways, and is not limited to the embodiments set forth herein.

Parts that are irrelevant to the description will be omitted to clearly describe the present disclosure, and like reference numerals designate like elements throughout the specification.

Further, in the figures, the size and thickness of each element are arbitrarily illustrated for convenience of description, and the present disclosure is not necessarily limited to those illustrated in the drawings. In the figures, the thickness of layers, regions, etc. are exaggerated for clarity. In the drawings, for convenience of description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the specification, when a part is referred to as "including" a certain component, it means that it can further include other components, without excluding the other components, unless otherwise stated.

Further, throughout the specification, when referred to as "planar", it means when a target portion is viewed from the top, and when referred to as "cross-sectional", it means when a target portion is viewed from the side of a cross section cut vertically.

FIG. 1 is a perspective view illustrating a portion of a battery module according to an embodiment of the present disclosure. FIG. 2 is a cross-sectional view taken along the cut line A-A' of FIG. 1.

Referring to FIGS. 1 and 2, a battery module 100 according to the present embodiment includes a module frame 300, a battery cell stack 120 inserted in the module frame 300, and a busbar frame 130 located on an open side of the module frame 300 and connected to the battery cell stack 120. The battery cell stack 120 is formed by stacking a plurality of battery cells 110 in one direction.

The module frame 300 may be in the form of a mono frame covering four surfaces excluding the front surface and rear surface of the battery cell stack 120. This means the mono frame is in a form that requires horizontal assembly in order to insert the battery cell stack 120 into the mono frame. However, the module frame 300 is not limited to a mono frame, and may be in a form that includes a U-shaped frame with open upper, front and rear surfaces, and an upper plate covering the upper portion of the battery cell stack 120.

A cell terrace 135 extending from a pouch covering the battery cell 110 is formed, and the electrode leads 160 protruding from the cell terrace 135 may make contact to pass through a lead slot (not shown). The gap between neighboring cell terraces 135 may become narrower as the distance from the battery cell 110 increases. At this time, the electrode leads 160 protruding from the cell terrace 135 may have the same polarity. In the case where two electrode leads 160 adjacent to each other have different polarities, the gap between the cell terraces 135 from which each of the two electrode leads 160 protrude may rather widen as the distance from the battery cell 110 increases.

According to the present embodiment, a compression pad 200 is formed between the outermost battery cell 110 and a side surface portion of the module frame 300. The compression pad 200 may be formed using a polyurethane-based material. The compression pad 200 may absorb a thickness change of the battery cell 110 due to its swelling and changes of the battery cell 110 due to external impact. At least one compression pad 200 may be formed not only between the outermost battery cell 110 and the side surface portion of the module frame 300, but also between neighboring battery cells 110.

A path guider 260 is formed on the busbar frame 130. The path guider 260 is for guiding so that the electrode leads 160 pass through the lead slot, before forming the cell terrace 135 which allows the electrode leads 160 of each of the three adjacent battery cells 110 to be extended, and it be formed on one side of the busbar frame 130. Specifically, the busbar frame 130 may be provided with a path guider 260 inside the rear surface of the busbar frame 130 located spaced apart from the battery cells 110.

Such a path guider 260 may form a predetermined guide space at the rear surface of the busbar frame 130 so that the three electrode leads 160 and the cell terraces 135 can be brought close to each other before passing through the lead slot. A plurality of path guiders 260 may be provided. Here, the plurality of path guiders 260 may be provided to correspond to the number of plurality of lead slots. Accordingly, adjacent electrode leads 160 among the plurality of battery cells 110 form three pairs, and then via the path guider 260, the electrode leads 160 may pass through the lead slot to form an electrode lead 160 group.

The number of electrode leads 160 forming the electrode lead 160 group is not limited to three, and may be modified according to the arrangement of the electrode leads of the positive electrode and the negative electrode of the battery cell 110.

FIG. 3 is a plan view schematically illustrating a welding structure between an electrode lead and a busbar according to a comparative example. FIG. 4 is a plan view schematically illustrating a welding structure between an electrode lead and a busbar according to an embodiment of the present disclosure.

Referring to FIG. 3, a plurality of electrode leads 160 protrude from a cell terrace 135 extending from a pouch covering the battery cells 110. The electrode leads 160 protruding from the cell terrace 135 may be bent in a direction where the busbar 280 is located on the busbar frame 130. The bent electrode leads 160 overlap with the same busbar 280, and the plurality of electrode leads 160 and the busbar 280 are simultaneously welded to form one welding point WP. At this time, the following restrictions arise in order to weld several electrode leads 160 at the same time. First, as the electrode leads 160 are overlapped, the welding machine requires a higher specification in order to weld the thickened electrode lead 160. Second, as the number of electrode leads 160 overlapping with each other increases, the welding machine must have a higher specification. Third, as the number of the electrode leads 160 overlapping with each other increases, the welding deviation of each electrode lead 160 layer increases, which may deteriorate welding quality. That is, the electrode lead 160 layer closest to the welding machine may be over-welded, and the electrode lead 160 layer located farthest from the welding machine may be weakly welded.

Referring to FIG. 4, the electrode tab and electrode lead 160 of each of the battery cells 110 included in the battery module according to an embodiment of the present disclosure are connected. A plurality of electrode leads 160 protrude from the cell terrace 135 extending from the pouch covering the battery cells 110. The electrode leads 160 protruding from the cell terrace 135 may be bent in a direction where the busbar 280 is located. The bent electrode leads 160 overlap with the same busbar 280, and a plurality of electrode leads 160 may be welded to one busbar 280. At this time, according to the present embodiment, at least two welding portions WP1 and WP2 are formed in the overlapping portions of one busbar 280 and the electrode leads 160.

Specifically, according to the present embodiment, the electrode leads are formed of N number of leads 160, and the N electrode leads 160 may overlap with the same busbar 280. N is a natural number and may be at least 2. The N electrode leads 160 have the same polarity. The bent electrode leads 160 overlap with the same busbar 280, and a plurality of electrode leads 160 may be welded to the busbar 280 to form a welding point. At this time, the welding point includes at least two welding portions WP1 and WP2, wherein the first welding portion WP1 is a portion welded between the N electrode leads 160, and the second welding portion WP2 is a portion welded between the N−1 electrode leads 160 among the N electrode leads, with the electrode lead 160 closest to the busbar 280 and the busbar 280 being welded.

More specifically, the N electrode leads 160 include a first electrode lead 160a, a second electrode lead 160b, and a third electrode lead 160c. The first electrode lead 160a, the second electrode lead 160b, and the third electrode lead 160c are bent toward the same busbar 280, and the bending angle increases in the order of the first electrode lead 160a, the second electrode lead 160b, and the third electrode lead 160c. In the present embodiment, the length of the third electrode lead 160c overlapping with the busbar 280 is shorter than the length of the first electrode lead 160a overlapping with the busbar 280. Here, the first welding portion WP1 is a portion where the first electrode lead 160a, the second electrode lead 160b, and the third electrode lead 160c are simultaneously welded, or where the second electrode lead 160b and the third electrode lead 160c are simultaneously welded, and the second welding portion WP2 may be a portion where the first electrode lead 160a, the second electrode lead 160b, and the busbar 280 are simultaneously welded.

As such, according to the present embodiment, when welding a plurality of electrode leads 160, by forming at least two welding points of the overlapping portion of the busbar 280 and the electrode lead 160, it is possible to reduce unnecessary increase in welding machine specifications, and enable stable management of welding quality. In addition, by forming the length of the third electrode lead 160c overlapping with the busbar 280 to be shorter than the length of the first electrode lead 160a, the electrode lead cutting process is eliminated or the amount of cutting is reduced, thereby minimizing cost loss, and it is possible to implement a compact battery module structure by minimizing the gap between the busbar frame and the battery cell stack.

Hereinafter, a method of manufacturing a battery module according to another embodiment of the present disclosure will be described with reference to FIGS. 5 to 7.

FIG. 5 is an enlarged view illustrating a connection relationship between a cell terrace, an electrode lead, and a busbar in FIG. 1. FIG. 6 is a plan view illustrating a region P of FIG. 5. FIG. 7 is a front view illustrating region P of FIG. 5.

FIG. 5 is a view in which the busbar frame 130 of FIG. 2 is removed.

Referring to FIGS. 2, 5, and 6, the method of manufacturing a battery module according to the present embodiment includes forming a battery cell stack 120 by stacking a plurality of battery cells 110, overlapping the electrode leads 160 each protruding from the battery cells 110 adjacent to each other among the battery cells 110 on the same busbar 280, and welding the electrode leads 160 and the busbar 280 in at least two different locations among the overlapping portions of the electrode leads 160 and the busbar 280.

Referring to FIGS. 6 and 7, welding the electrode leads 160 and the busbar 280 may include forming a first welding portion WP1 for welding electrode leads 160 adjacent to each other, and a second welding portion WP2 for welding the electrode leads 160 adjacent to each other with the busbar 280. Specifically, as shown in FIG. 6, the first welding portion WP1 may be formed by simultaneously welding the first electrode lead 160a, the second electrode lead 160b, and the third electrode lead 160c, or by simultaneously welding the second electrode lead 160b and the third electrode lead 160c, and the second welding portion WP2 may be formed by simultaneously welding the first electrode lead 160a, the second electrode lead 160b, and the busbar 280. At this time, the electrode leads 160 may be fixed by pressing the electrode leads 160 with a fixing jig 160FM before forming the first and second welding portions WP1 and WP2. As shown in FIG. 7, the fixing jig 160FM may have a first opening AP1 corresponding to the first welding portion WP1 and a second opening AP2 corresponding to the second welding portion WP2.

Meanwhile, one or more battery modules according to an embodiment of the present disclosure can be packaged in a pack case to form a battery pack.

The above-mentioned battery module and a battery pack including the same may be applied to various devices. These devices may be applied to vehicles such as an electric bicycle, an electric vehicle, a hybrid vehicle, but the present disclosure is not limited thereto but can be applied to various devices that can use the battery module and the battery pack including the same, which also belongs to the scope of the present disclosure.

Although the preferred embodiments of the present disclosure have been described in detail above, the scope of the present disclosure is not limited thereto, and various modifications and improvements of those skilled in the art using the basic concepts of the present disclosure defined in the following claims also belong to the scope of rights.

The invention claimed is:

1. A battery module, comprising:
a battery cell stack in which a plurality of battery cells are stacked;
a busbar frame connected to the battery cell stack and having a plurality of busbars;
cell terraces each protruding from battery cells adjacent to each other among the plurality of battery cells included in the battery cell stack; and
electrode leads each protruding from the cell terraces and having the same polarity,
wherein the electrode leads overlap in different lengths, respectively, with the same busbar among the plurality of busbars, and have at least two welding points at overlapping portions of the same busbar and the electrode leads,
wherein the electrode leads include N number of the electrode leads, and the N electrode leads overlap with the same busbar,
wherein the at least two welding points include a first welding point and a second welding point, and the first welding point is welded between the N electrode leads and an electrode lead closest to the same busbar, and the second welding point is welded between N−1 electrode leads among the N electrode leads and the same busbar.

2. The battery module of claim 1, wherein,
the N electrode leads comprise a first electrode lead, a second electrode lead, and a third electrode lead, and
the first electrode lead, the second electrode lead, and the third electrode lead are bent toward the same busbar, and respective bending angles between the N electrode leads and the same busbar increase in the order of the first electrode lead, the second electrode lead, and the third electrode lead.

3. The battery module of claim 2,
wherein a length of the third electrode lead overlapping with the same busbar is shorter than a length of the first electrode lead overlapping with the same busbar.

4. The battery module of claim 1,
wherein the cell terraces from which the electrode leads having the same polarity protrude have narrowing spacing along a direction in which the electrode leads protrude.

5. The battery module of claim 1, further comprising a frame with an opening, and containing the battery cell stack, wherein the busbar frame is located at the opening.

6. The battery module of claim 1, wherein the electrode leads include a first electrode lead proximal to the same busbar and a second electrode lead distal to the same busbar, and
wherein a first length of overlap of the first electrode lead with the same busbar is longer than a second length of overlap of the second electrode lead with the same busbar.

7. The battery module of claim 1, further comprising:
a compression pad interposed between the plurality of battery cells; and
a path guider formed inside a rear surface of the busbar frame and located spaced apart from the plurality of battery cells,
wherein the compression pad and the path guider are aligned in the battery module.

8. A battery pack comprising at least one of the battery module according to claim 1.

9. A method of manufacturing a battery module, the method comprising:
forming a battery cell stack by stacking a plurality of battery cells;
overlapping electrode leads each protruding from battery cells adjacent to each other among the plurality of battery cells on a same busbar in different lengths, respectively; and
welding the electrode leads and the same busbar in at least two different locations among overlapping portions of the electrode leads and the same busbar,
wherein the electrode leads include N number of the electrode leads, and the N electrode leads overlap with the same busbar,
wherein the welding of the electrode leads and the same busbar comprise forming the at least two welding points including a first welding point and a second welding point, and the first welding point is welded between the N electrode leads and an electrode lead closest to the same busbar, and the second welding point is welded between N−1 electrode leads among the N electrode leads and the same busbar.

10. The method of claim 9, further comprising,
fixing the electrode leads by pressing the electrode leads with a fixing jig before forming the first welding point and the second welding point.

11. The method of claim 10,
wherein the fixing jig has a first opening corresponding to the first welding point and a second opening corresponding to the second welding point.

12. The method of claim 9, wherein the electrode leads include a first electrode lead proximal to the same busbar and a second electrode lead distal to the same busbar, and
wherein a first length of overlap of the first electrode lead with the same busbar is longer than a second length of overlap of the second electrode lead with the same busbar.

13. The method of claim 9, wherein the battery module includes a compression pad interposed between the plurality of battery cells, and a path guider formed inside a rear surface of the busbar frame and located spaced apart from the plurality of battery cells,
wherein the compression pad and the path guider are aligned in the battery module.

* * * * *